United States Patent Office 3,494,856
Patented Feb. 10, 1970

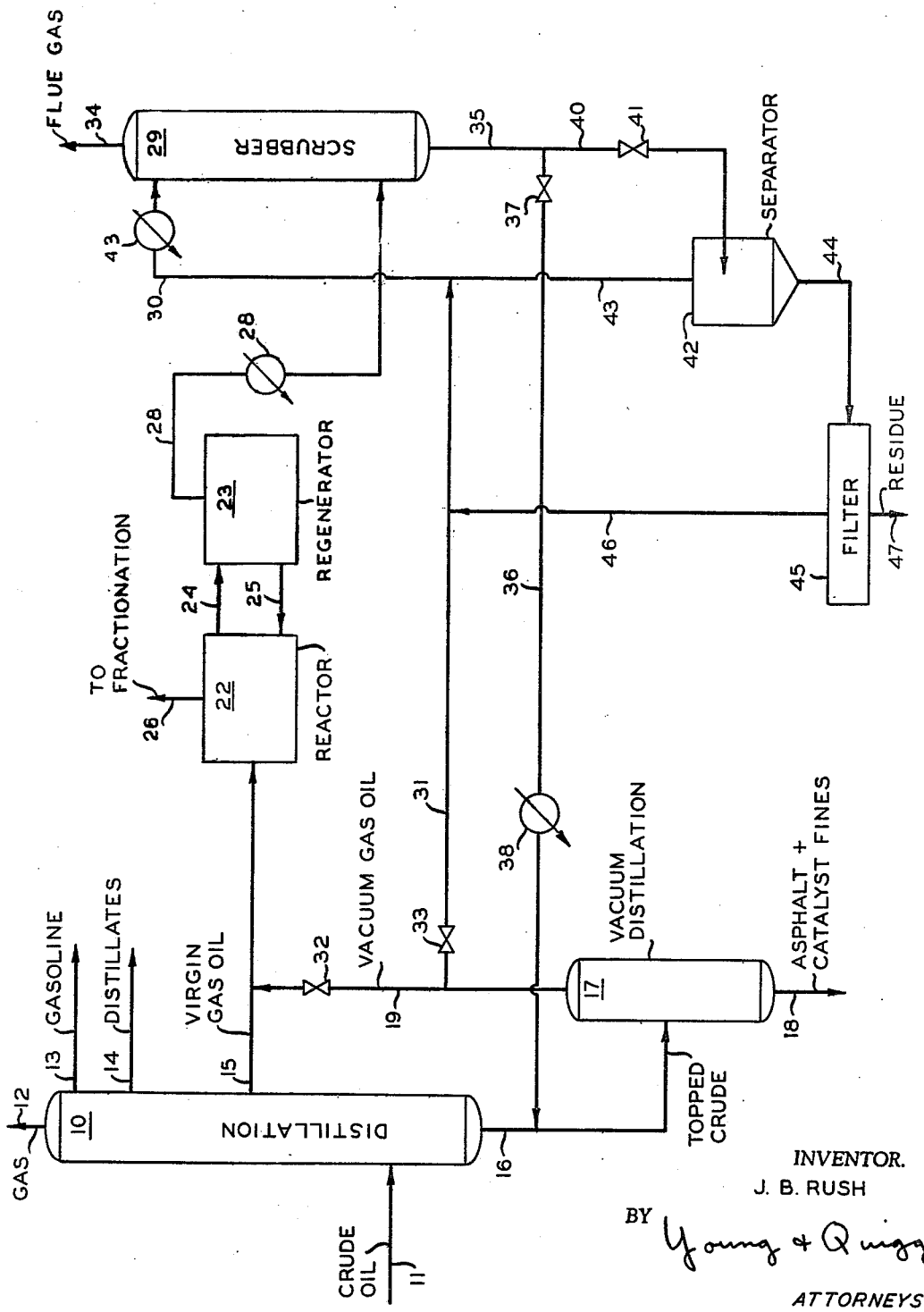

3,494,856
CATALYST FINES REMOVAL
John B. Rush, Bartlesville, Okla., assignor to Phillips Petroleum Company, a corporation of Delaware
Filed Jan. 15, 1968, Ser. No. 698,036
Int. Cl. C10g 11/18
U.S. Cl. 208—113      7 Claims

ABSTRACT OF THE DISCLOSURE

Catalyst fines are removed from a gaseous stream by scrubbing the stream with oil. The resulting oil, containing catalyst fines, is introduced as feed into a distillation column wherein asphalt is separated as a product stream. The catalyst fines appear in the asphalt.

This invention reltes to the removal and disposal of catalyst fines contained in effluent gaseous streams.

It is common practice in the petroleum refining industry to subject hydrocarbon streams to catalytic cracking operations to produce products having greater value. Various types of fluidized catalytic crackers have been developed for this purpose. These catalytic crackers normally comprise a reaction vessel and a catalyst regeneration vessel. In the regeneration vessel, the catalyst particles are subjected to an oxidizing atmosphere at relatively high temperatures to burn coke deposits off the catalyst particles. Unfortunately, a substantial volume of catalyst fines is produced in a fluidized catalytic cracking operation of this type, and large amounts of these fines are often entrained in the effluent flue gases from the regenerator.

In order to prevent atmospheric contamination by the catalyst fines, it is necessary to subject the flue gases to rather expensive treating steps. One system which has been used involves passing these gases through electrostatic precipitators. However, large precipitators are required and these are quite expensive. Another procedure which has been proposed for the removal of catalyst fines comprises scrubbing the flue gas with an oil to remove the fines. However, the scrubbing oil must then be treated to remove the fines. Filtering operations to perform this function are quite expensive, and there still remains the problem of disposing of substantial volumes of the fines, which are then present in the form of a paste with the scrubbing oil.

In accordance with the present invention, a method is provided for removing catalyst fines from gaseous streams in a relatively inexpensive manner and for disposing of the removed catalyst fines. This is accomplished by first scrubbing the flue gas with an oil to remove the catalyst fines. The resulting oil containing the catalyst fines is then introduced into a distillation unit wherein asphalt is being produced. It has been discovered that substantial volumes of catalyst fines can be incorporated into the resulting asphalt in this manner without materially affecting the desired properties of the asphalt. This permits removal of substantial quantities of fines from a refining operation without extensive disposal procedures.

Accordingly, it is an object of this invention to provide an improved method of removing catalyst fines from gaseous streams.

Another object is to provide a method of disposing of catalyst fines in a refining operation.

Other objects, advantages and features of the invention should become apparent from the following detailed description, taken in conjunction with the accompanying drawing which is a schematic representation of a refining operation incorporating the method of this invention.

Referring now to the drawing in detail, there is shown a distillation column 10. A crude oil to be refined is introduced into column 10 through a conduit 11. The distillation column, which actually can comprise one or more columns, produces several product streams. As illustrated, a gaseous product is removed through an overhead conduit 12. Side stream withdrawal conduits 13, 14 and 15 remove gasoline, distillates and virgin gas oil, respectively. A topped crude kettle product is removed through a conduit 16 which communicates with a vacuum distillation column 17. Column 17 is operated to produce an asphalt kettle product which is removed through a conduit 18 and an overhead vacuum gas oil product which is removed through a conduit 19, the latter communicating with conduit 15.

The two gas oil streams passed through conduits 15 and 19 are introduced into a catalytic cracking reactor 22. This reactor, in combination with a regenerator 23, constitutes a fluidized catalytic cracking unit, which can be of any known type. Spent catalyst from reactor 22 is conveyed to regenerator 23 through a conduit 24, and regenerated catalyst is returned to reactor 22 through a conduit 25. The cracking products from reactor 22 are removed through a conduit 26 and delivered to suitable fractionation or other processing units, not shown.

An effluent flue gas stream, which contains appreciable quantities of catalyst fines, is removed from regenerator 23 through a conduit 28. In accordance with the present invention, conduit 28 communicates with a scrubbing column 29. A cooler 28' is disposed in conduit 28 to reduce the temperature of the flue gas stream from approximately 1100° F. to approximately 500° F. Scrubbing oil is introduced into the upper region of column 29 by a conduit 30. Makeup scrubbing oil is supplied to conduit 30 through a conduit 31 which extends from conduit 19. Conduits 19 and 31 have respective valves 32 and 33 therein to control the flows of vacuum gas oil to reactor 22 and scrubber 29 respectively. An effluent flue gas stream substantially free of catalyst fines is removed from the top of scrubber 29 through a conduit 34. An oil stream containing entrained catalyst fines is removed from the bottom of scrubber 29 thruoh a conduit 35.

All or a substantial portion of the oil system removed through conduit 35 is introduced into the feed to vacuum distillation unit 17. To this end a conduit 36, which has a valve 37 and a heater 38 therein, communicates between conduit 35 and feed conduit 16 is distillation column 17. The catalyst fines entrained in the scrubbing oil are thus contained in the asphalt kettle product from column 17.

In certain operations of this type, it may not be possible or practical to incorporate all of the catalyst fines into the asphalt product. For example, excessive amounts of such fines may result in an asphalt product which does not meet certain specifications. Under these circumstances, the remainder of the catalyst fines can be removed by a filtering operation. A conduit 40, which has a valve 41 therein, communicates between conduit 35 and the inlet of a separator 42. This separator can be a cyclone separator or a centrifuge, for example. An effluent oil stream which has substantial amounts of catalyst fines removed therefrom is recovered from the overhead of separator 42 and passed by a conduit 43 to conduit 30. A conduit 44 extends from the bottom of separator 42 to a filter 45 to pass a residue catalyst containing oil stream to the filter. The resulting filtrate is removed through a conduit 46 which communicates with conduit 30. The residue, which is in the form of a paste of catalyst fines and oil, is removed through line 47 for disposal. A cooler 48 is provided in conduit 30 to cool the scrubbing oil to a desired scrubbing temperature. The amount of cooling required depends to a large extent on the amount of makeup oil which is introduced through conduit 31. In normal operation, the maximum permissible amount of catalyst fines is delivered by conduit 36 to distillation column 17.

As a specific example of the operation of the process of this invention, 35,000 barrels per day of a Western Kansas crude oil having an API gravity of 36.0 at 60° F. are introduced into distillation column 10. Typical flows and operating conditions of the process are set forth in the following table.

hydrocarbon effluent stream therein, and passing the resulting hydrocarbon effluent stream from said separation zone to said contact zone to contact additional gaseous effluent from said treating zone.

3. The method of claim 2 wherein said separation zone comprises a cyclone separator and a filter, said second portion of said effluent stream is passed to said cyclone separator, the bottoms stream from said cyclone separator is passed to said filter, and the overhead stream from said cyclone separator and the filtrate from said filter are passed to said contact zone to contact additional effluent from said treating zone.

| | Conduit | | | | | | | | | | | | |
|---|---|---|---|---|---|---|---|---|---|---|---|---|---|
| | 16 | 18 | 28 | 30 | 35 | 40 | 36 | 34 | 19 | 31 | 44 | 43 | 47 | 46 |
| Flow (barrels/day) | 8,750 | 3,500 | | 4,000 | 4,000 | 1,840 | 2,160 | | 7,410 | 2,200 | 540 | 1,300 | 40 | 500 |
| Flow (M s.c.f./day) | | | 2,000 | | | | | 2,000 | | | | | | |
| Gravity (API, 60° F.) | 18.0 | 10.4 | | 25.0 | 24.4 | 24.4 | 24.4 | | 25.1 | 25.1 | | | | |
| Catalyst fines (pounds/day) | [1]0.35 | 8,010 | 80 | 8,000 | 3,680 | 4,320 | 90 | Nil | Nil | | 3,600 | 80 | 3,600 | Nil |

[1] Weight percent rather than pounds/day.

The catalyst is a silica-alumina cracking catalyst. The fines removed from regenerator 23 are generally 300 to 400 mesh (U.S. Standard Sieve). Column 17 is operated at a bottom temperature of about 750° F. and at a pressure of about 50 mm. mercury absolute. Scrubber 29 is operated at a bottom temperature of about 375° F., a top temperature of about 325° F., and at a pressure of about 10 p.s.i.a. The ratio of barrels of scrubbing oil to MSCF gas is of the order of 2:1. Of course, these conditions can vary from the typical values set forth. The produced asphalt has the following properties:

Property: Value
- Oliensis spot test _____ Negative
- Ductility, cm. (77° F., 5 cm./sec.) _____ +110
- R&SP, °F. _____ 125
- Penetration (5 sec., 100 gm., 77° F.) _____ 87
- Solubility in carbon tetrachloride (wt. percent) _____ 99.6

The amount of catalyst fines which can be added to distillation column 17 depends on the desired specifications of the asphalt. However, substantial quantities of fines can be added in nearly all commercial operations.

While this invention has been described in conjunction with presently preferred embodiments, it obviously is not limited thereto.

What is claimed is:

1. In an integrated refining operation wherein a first hydrocarbon stream is passed to a catalytic treating zone, from which a gaseous effluent stream is removed which contains catalyst fines, and wherein a second hydrocarbon stream is passed to a distillation zone, from which an asphalt product is produced; the method of removing catalyst fines from the operation which comprises passing the gaseous effluent stream from the treating zone to a contact zone, passing a hydrocarbon stream to said contact zone to contact said gaseous effluent stream and remove catalyst fines therefrom, thereby producing a hydrocarbon effluent stream containing catalyst fines, and passing at least a portion of said hydrocarbon effluent stream from said contacting zone to said distillation zone so that catalyst fines contained in said hydrocarbon effluent stream are incorporated in the asphalt product.

2. The method of claim 1, further comprising passing a second portion of said hydrocarbon effluent stream to a separation zone and removing catalyst fines from said 4. A method of producing asphalt and removing catalyst fines comprising passing a crude oil to a first distillation zone and recovering therefrom at least a topped crude oil and a gas oil; passing the gas oil to a catalytic cracking zone; passing spent catalyst from the cracking zone to a regeneration zone; passing an effluent gas containing catalyst fines from said regeneration zone to a contact zone; passing an oil stream to said contact zone to contact said gas and remove catalyst fines therefrom, thereby producing an effluent oil stream containing catalyst fines; passing the topped crude oil to a second distillation zone and recovering a gas oil and asphalt therefrom; and passing at least a portion of the effluent oil containing catalyst fines to said second distillation zone so that catalyst fines are incorporated in the asphalt.

5. The method of claim 4, further comprising passing a second portion of said effluent oil to a separation zone and removing catalyst fines from said effluent oil therein, and passing the resulting effluent oil from said separation zone to said contact zone to contact additional gas from said regeneration zone.

6. The method of claim 4 wherein gas oil from said second distillation zone is passed as feed to said cracking zone.

7. The method of claim 5 wherein said separation zone comprises a cyclone separator and a filter, said second portion of said effluent oil is passed to said cyclone separator, the bottoms stream from said cyclone separator is passed to said filter, and the effluent stream from said cyclone separator and the filtrates from said filter are passed to said contact zone to contact additional gas from said regeneration zone.

References Cited

UNITED STATES PATENTS

| 2,125,325 | 8/1938 | Youker | 208—41 |
| 2,937,989 | 5/1960 | Huntley et al. | 208—140 |
| 2,614,659 | 10/1952 | Holland | 55—89 |

DELBERT E. GANTZ, Primary Examiner

A. RIMENS, Assistant Examiner

U.S. Cl. X.R.

55—89; 208—41, 93, 140; 252—417